United States Patent [19]

Tokunaga et al.

[11] 4,240,672
[45] Dec. 23, 1980

[54] SKID CONTROL SYSTEM

[75] Inventors: Masayuki Tokunaga, Tokyo; Yoshio Otsuka, Yokohama, both of Japan

[73] Assignee: Nissan Motor Company, Limited, Japan

[21] Appl. No.: 24,172

[22] Filed: Mar. 26, 1979

[30] Foreign Application Priority Data

Apr. 10, 1978 [JP] Japan .................................. 53/41979

[51] Int. Cl.³ .............................................. B60T 8/00
[52] U.S. Cl. ..................................... 303/92; 303/115; 303/116
[58] Field of Search .............................. 303/113–119, 303/92; 188/151 A; 200/82 D, 153 H

[56] References Cited

U.S. PATENT DOCUMENTS

| 3,672,731 | 6/1972 | Koivunen | 303/115 |
| 3,813,130 | 5/1974 | Inada | 303/115 |
| 3,913,984 | 10/1975 | Every et al. | 303/116 |
| 3,922,021 | 11/1975 | Every | 303/92 X |
| 3,936,095 | 2/1976 | Every | 303/92 |
| 3,963,276 | 6/1976 | Atkins | 303/92 |

Primary Examiner—Douglas C. Butler
Attorney, Agent, or Firm—Lane, Aitken, Ziems, Kice & Kananen

[57] ABSTRACT

A flow restriction between the control chamber of the expansion valve of the anti-skid device and the pump of the device prevents the expansion valve from moving as soon as the spool valve arrangement which opens the fail safe pressure transmission path and closes the normal path. The expansion chamber of the expansion valve is thus, in the case of pump failure, isolated from the pressure reservoir like effect of the pressure stored in the wheel cylinder(s) and the conduit between the skid device and the wheel cylinder(s) and therefore does not move as far before pressure equalization occurs across the expansion valve as in the case when a normal anti-skid operation is performed and the pressure in the wheel cylinder and the conduit is fully received in the expansion chamber. A switch incorporated in the anti-skid device is closed only when the expansion valve moves beyond the position assumed during pump failure.

7 Claims, 5 Drawing Figures

Fig. 1 PRIOR ART

Fig. 2
NORMAL BRAKING OPERATION

Fig. 3
SKID CONTROL OPERATION

Fig. 4
FAIL SAFE OPERATION

Fig. 5

SKID CONTROL SYSTEM

BACKGROUND OF THE INVENTION

The present invention relates to a vehicular skid control system and particularly to an improvement in a switch device which generates an electric signal when a vehicular skid control system is in an operating condition for eliminating a skid condition of a vehicle.

Figure 1:
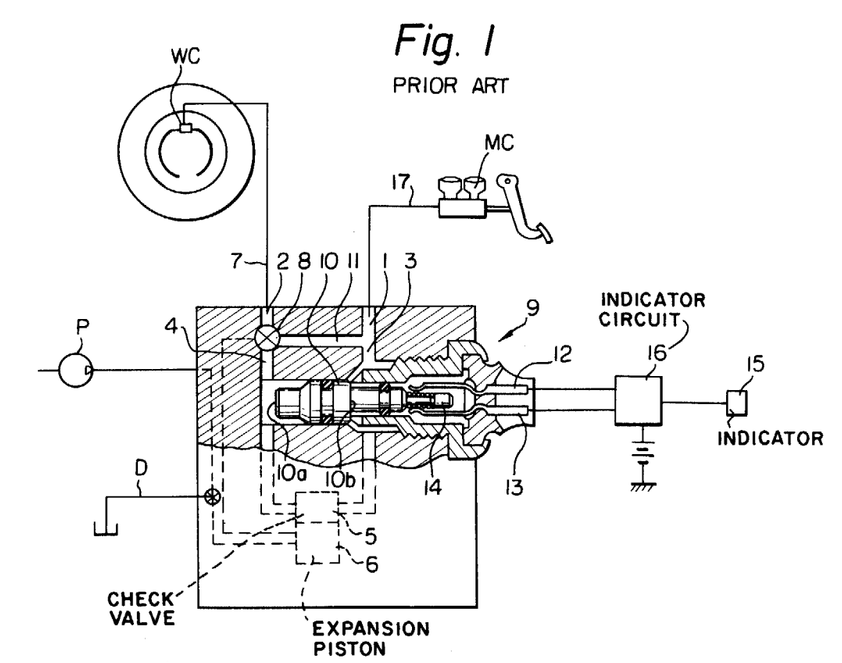
FIG. 1 is a schematic view of a prior art skid control system.

As is well known in the art and as is shown in FIG. 1 of the drawings, a vehicular skid control system usually includes a body having an inlet port 1 connected to a master cylinder MC, an outlet port 2 connected to a rear wheel brake cylinder WC of a vehicle, and passages 3 and 4 communicating respectively with the inlet and outlet ports 1 and 2. A check valve 5 is disposed between the passages 3 and 4 to control fluid flow from the passage 3 to the passage 4. During normal braking operation, the check valve 5 is opened by an actuator or expansion piston 6 which is moved in a direction by pressurized hydraulic fluid fed from a pressurized hydraulic fluid source P to a working chamber. When the vehicle is in a skid condition, a valve stops the supply of pressurized hydraulic fluid to the working chamber and connects the working chamber to a sump D to exhaust hydraulic fluid in the working chamber. As a result, the expansion piston 6 is moved in a reverse direction to cause closing of the check valve 5 and concurrently to reduce the pressure of hydraulic fluid confined in the passage 4 and a passage 7 between the outlet port 2 and the rear wheel cylinder WC to remove the skid condition of the vehicle. A switch-over valve 8 is disposed between the outlet port 2 and the check valve 5 and normally allows communication between the passage 4 and the outlet port 2. In the event of failure of the presurized hydraulic fluid source P, (viz., a loss of hydraulic pressure) the switch-over valve 8 directly connects the inlet port 1 to the outlet port 2 by way of a bypass passage 11 without passing the passages 3 and 4 to insure the normal braking operation only. The skid control system usually also includes a switch device which senses a skid control operation of the system for providing an indication thereof to a driver.

In the prior art, the switch device 9 includes, as shown in FIG. 1, a switch piston 10 having one end surface 10a communicating with the passage 4 to receive a rear wheel braking fluid pressure, and the other end surface 10b communicating with the passage 3 to receive a master cylinder fluid pressure, an electric conductor 14 fixed to the switch piston 10, and a switch taking the form of brushes 12 and 13 electrically connectable to and disconnectable from each other by the electric conductor 14. During normal braking operation in which the fluid pressures in the passages 3 and 4 are equal to each other, the electric conductor 14 is moved rightwards in the drawing by the hydraulic pressure acting on the end surface 10a larger in area than the end surface 10b to electrically disconnect the brushes 12 and 13 from each other. On the other hand, during a skid control operation in which the rear wheel braking fluid pressure is extremely lower than the master cylinder fluid pressure, the electric conductor 14 is moved by the fluid pressure acting on the end surface 10b leftwards in the drawing to electrically connect the brushes 12 and 13 to each other. In response to closing of the switch, an indicator 15 is actuated by an indicator circuit 16 to indicate that the skid control system is under the skid control operation.

The end surface 10a of the switch piston 10 communicates with the passage 4 at a portion upstream of the switch-over valve 8. This upstream portion is separated from the passage 3 by the check valve 5 and from the passages 7 and 17 by the switch-over valve 8 in the event of failure of the source P. Thus, at this time, the hydraulic fluid pressure acting on the end surface 10a is reduced so that the switch is closed to indicate that the system is under a skid control operation in spite of the fact that it is not actually so. For solving this problem, it is considered feasible, for example, to indicate in combination a signal representative of failure of the source P or operation of the switch-over valve and a signal representative of a skid control operation. However, this solution suffers from the drawbacks that the number of component elements is increased and the hydraulic fluid circuit is complicated.

Also, in the conventional skid control system, since the switch piston 10 is moved during a skid control operation as mentioned above, it is necessary to replenish pressurized hydraulic fluid corresponding to the displacement of the switch piston 10 from the master cylinder. Since the replenished hydraulic fluid is returned to the master cylinder when the skid control operation is finished, the system suffers from the drawback that a shock is given to a brake pedal.

Furthermore, in the conventional skid control system, since the switch piston 10 operating the electric conductor 14 is located in hydraulic fluid, it is necessary to provide a seal between the switch piston 10 and the electric conductor 14. Thus, the system suffers from the drawback that a malfunction of the switch device 9 occurs when a seal is defective.

SUMMARY OF THE INVENTION

It is, therefore, an object of the invention to provide in a skid control system, an arrangement including a switch device which is actuated in response only to a skid control condition of the system and in which the provision of the switch does not exert a shock on a brake pedal and no seal construction is required.

The switch device is constructed and arranged so that it is mechanically actuated by an expansion piston so as to sense the difference, in amount, in the movement of the expansion piston from its normal braking position during the skid control operation from that during the fail safe operation.

BRIEF DESCRIPTION OF THE DRAWINGS

These and other features and advantages of the invention will become more apparent from the following detailed description taken in connection with the accompanying drawings in which.

DETAILED DESCRIPTION OF THE PREFERRED EMBODIMENTS

Figure 2:
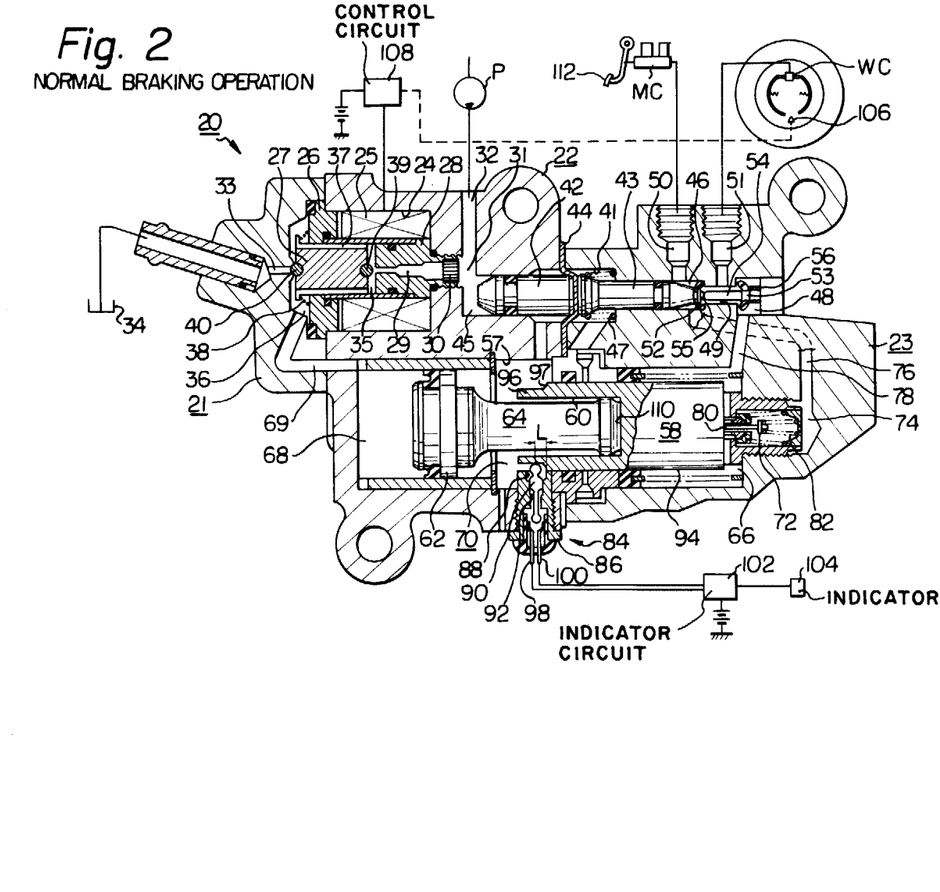
FIG. 2 is a schematic cross-sectional view of a preferred first embodiment of a skid control system incorporating the present invention.
Figure 3:
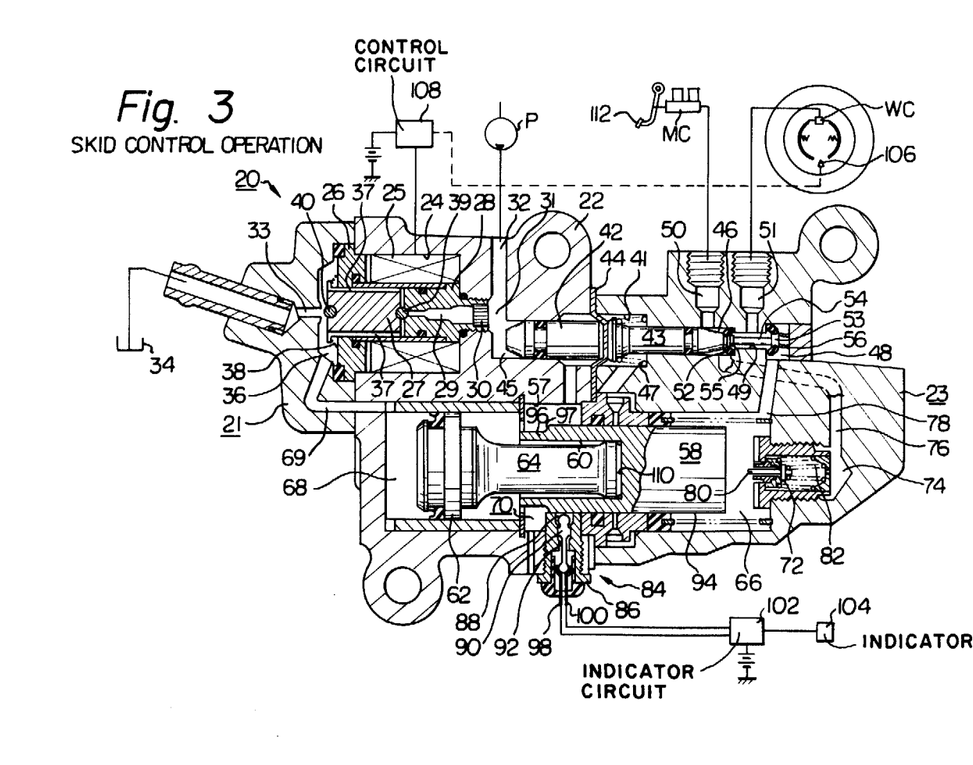
FIG. 3 is a schematic cross-sectional view of the skid control system shown in FIG. 2 which is under a skid control operation.
Figure 4:
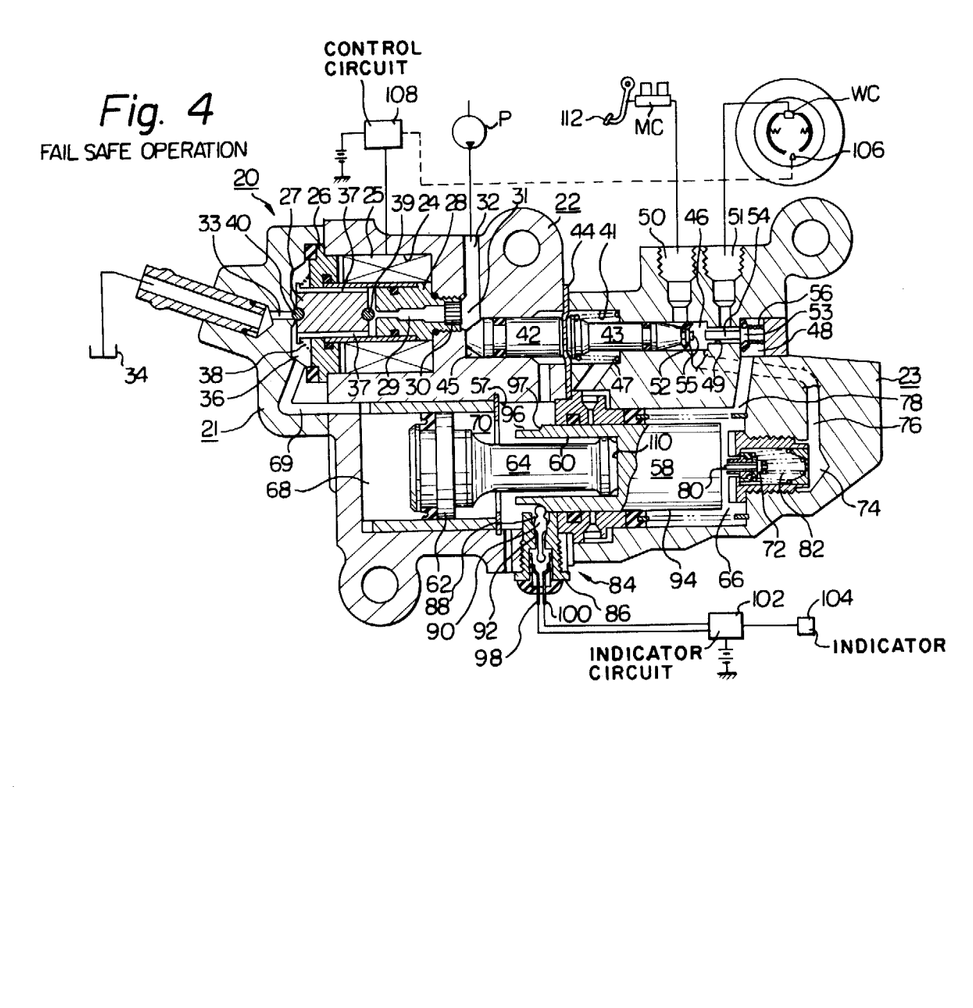
FIG. 4 is a schematic cross-sectional view of the skid control system, shown in FIG. 2, in the event of failure of a pressurized hydraulic fluid source.

Referring to FIGS. 2 to 4 of the drawings, a skid control system according to the invention is identified by the reference numeral 20. The skid control system 20 comprises three blocks 21, 22 and 23 fixed to each other to constitute a body of the system 20 and accommodating therein component elements of the system 20.

A solenoid 25 and a plunger holder 26 each are received within a recess 24 formed over both the blocks 21 and 22. A plunger 27 is slidably received by the holder 26 and extends into a central bore of the solenoid 25. A seal plug 28 is located at one end of the recess 24 and is formed therethrough with a central bore 29 which receives a filter 30 therein. The block 22 has a chamber 31 and an inlet port 32 which communicates with the chamber 31 and with a pressurized hydraulic fluid source P such as a pump. The block 21 has a drain port 33 which communicates with a hydraulic fluid sump or tank 34. The plunger 27 has chambers 35 and 36 at both end portions thereof in the recess 24, respectively and is formed in its peripheral surface with axial grooves 37 which provide communication between the chambers 35 and 36. A spring is provided which urges the plunger 27 leftwards in the drawing. The chamber 35 is communicable with the chamber 31 by way of the central bore 29 and the filter 30, while the chamber 36 is communicable with the drain port 33. The plunger 27 has ball valves 39 and 40 received by the end portions thereof and projecting into the chambers 35 and 36 to open and close the central bore 29 and the drain port 33, respectively. The ball valve 39 closes the central bore 29 to separate the chamber 35 from the chamber 31 when the plunger 27 is moved rightwards in the drawing by the solenoid 25 in opposition to the force of the spring 38 when the solenoid 25 is energized. At this time, the drain port 33 is opened by the ball valve 40. The ball valve 40 closes the drain port 33 to separate the chamber 36 therefrom when the plunger 27 is moved leftwards by the force of the spring 38 when the solenoid 25 is deenergized. At this time, the ball valve 39 opens the bore 29 to communicate the chamber 35 with the chamber 31.

A bore 41 having a relatively small diameter is formed over both the blocks 22 and 23 and opens at one end into the chamber 31. First and second spools 42 and 43 are axially slidably received in the bore 41 and are aligned with each other. A pliable partition 44 is fixed to the blocks 22 and 23 and passes between the spools 42 and 43 and is touched by respective ends of the spools 42 and 43. The first spool 42 has at a left end portion thereof in the drawing a chamber 45 communicating with the chamber 31, while the second spool 43 has at a right end portion thereof in the drawing a chamber 46. A spring 47 is provided which urges the first and second spools 42 and 43 leftwards in the drawing. A chamber 48 is provided away from the chamber 46. A chamber 49 is provided which is alternatively communicable with the chambers 46 and 48. The block 23 has an inlet port 50 communicating with a master cylinder MC and with the chamber 46, and an outlet port 51 communicating with the chamber 49 and with a rear wheel brake cylinder WC of a vehicle (not shown). The second spool 43 has a first bypass valve 52 which is fixed thereto and controls communication between the chambers 46 and 49. A second bypass valve 53 is provided which controls communication between the chambers 48 and 49. The valve 53 has a stem 54 extending in the chamber 49 and contactable with a right end 55 of the second spool 43 for operating the valve 53. A spring 56 is provided which urges the valve 53 toward a position in which the valve 53 blocks communication between the chambers 48 and 49.

A bore 57 having a relatively large diameter is formed over both the blocks 22 and 23. An actuator or expansion piston 58 is slidably received in the bore 57 and is formed therein with a recess 60. An operating piston 62 is slidably received in the bore 57 concentrically with the expansion piston 58 and has a piston rod 64 fixed to the piston 62 and slidably received in the recess 60. The expansion piston 58 has an expansion chamber 66 at its right end in the drawing, while the operating piston 62 has at its left end in the drawing a chamber 68 which communicates with the chamber 36 by way of a passageway 69. A chamber 70 is defined between the expansion piston 58 and the operating piston 62 and communicates with the atmosphere. The expansion chamber 66 communicates by way of a check valve 72 with a chamber 74 which communicates with the chamber 46 by way of a passageway 76. The expansion chamber 66 also communicates with the chamber 48 by way of a passageway 78. The check valve 72 has a valve stem 80 fixed thereto and contactable with the expansion piston 58 for operating the check valve 72. The check valve 72 is moved by the expansion piston 58 in opposition to the action of a spring 82 into an open position in which the check valve 72 permits fluid flow from the chamber 74 to the expansion chamber 66 when the expansion piston 58 is in its normal braking position as shown in FIG. 2. The check valve 72 is moved by the action of the spring 82 into a closed position in which the check valve 72 prevents fluid flow from the chamber 74 to the expansion chamber 66 when the expansion piston 58 is in its left-hand positions as shown in FIGS. 3 and 4.

The expansion piston 58 is operatively connected to a switch device 84 which senses a skid control operation of the system 20 for providing an indication thereof. The switch device 84 comprises a body 86 threadedly received in the block 22. The body 86 is formed therein with a bore 88 which communicates with the chamber 70. A plunger 90 is slidably received in the bore 88 and extends transversely to the axis of the expansion piston 58 and projects into the chamber 70 when in a rest position as shown in FIG. 2. A spring 92 is provided which urges the plunger 90 toward the expansion piston 58. The expansion piston 58 has a large diameter portion 94 and a small diameter portion 96 connected thereto by way of an inclined ramp or step 97. The plunger 90 assumes the rest position in which it contacts at one end with a peripheral surface of the small diameter portion 96 of the expansion piston 58 when the piston 58 is in the normal braking position. The contacts or electric conductors 98 and 100 are disposed in the bore 88 and are spaced from each other. The plunger 90 is spaced at the other end from the conductors 98 and 100 to electrically disconnect the conductors from each other when in the rest position. The plunger 90 assumes an actuating position in which it is retracted into the bore 88 by the inclined surface 97 of the expansion piston 58 and contacts at the one end with a peripheral surface of the large diameter portion 94 of the expansion piston 58 when the piston 58 is moved leftwards in excess of a predetermined distance from the normal braking position. The plunger 90 contacts with the conductors 98 and 100 to electrically connect the conductors with each other when in the actuating position. It is necessary to decide the length L from the position of the contact of the plunger 90 with the small diameter portion 96 to the junction of the portion 94 and the step 97 when the expansion piston 58 is in the normal braking position shown in FIG. 2 in such a manner that the plunger 90 still contacts with the small diameter portion 96 as shown in FIG. 4 when the expansion piston 58 is moved into a position in which the check valve 72 is closed but the plunger 90 is brought into contact with the large diameter portion 94 as shown in FIG. 3 when the expansion piston 58 is moved a certain distance beyond the position in which the check valve 72 is closed.

An indicator circuit 102 is electrically connected to the conductors 98 and 100 and to an indicator 104 so that the indicator 104 is actuated by a signal of the circuit 102 to provide the indication when the conductors 98 and 100 are electrically connected to each other.

A sensor 106 is provided which senses a parameter such as the rate of rotation of a rear wheel of the vehicle which represents that the vehicle is in a skid condition when the parameter is at a value. A control circuit 108 is electrically connected to the sensor 106 to receive an output signal representative of the sensed parameter from the sensor 106. The control circuit 108 is also electrically connected to the solenoid 25 to feed an output signal thereto for energizing the solenoid 25 when the sensed parameter is at a value which represents that the vehicle is in a skid condition.

The skid control system 20 thus described is operated as indicated below.

(1) A normal braking operation (see FIG. 2)

A pressurized hydraulic fluid is fed from the pressurized hydraulic fluid source P to the chamber 45 by way of the inlet port 32 and the chamber 31. The spools 42 and 43 and the stem 54 are moved by the fluid pressure in the chamber 45 into a normal braking position as shown in FIG. 2 to close the valve 52 and concurrently to open the valve 53 to communicate the chamber 48 with the chamber 49. The pressurized hydraulic fluid in the chamber 31 is also fed into the chamber 68 by way of the filter 30, the bore 29, the chamber 35, the grooves 37, the chamber 36 and the passageway 69. The operating piston 62 and the piston rod 64 are moved by the fluid pressure in the chamber 68 rightwards in the drawing. The expansion piston 58 is moved by the piston rod 64 into the normal braking position shown in FIG. 2 to open the check valve 72 via the contact of the rod 64 with a bottom wall 110 of the bore 60 of the piston 58. At this time, the switch device 84 is open so that the indicator 104 is not actuated since the plunger 90 contacts at its end with the small diameter portion 96 of the expansion piston 58.

At this state, when a hydraulic fluid braking pressure is delivered from the master cylinder MC by depression of a brake pedal 112, the braking pressure is transmitted to the wheel cylinder WC by way of the inlet port 50, the chamber 46, the passageway 76, the chamber 74, the check valve 72, the expansion chamber 66, the passageway 78, the chambers 48 and 49 and the outlet port 51. As a result, the wheel cylinder WC is actuated to perform a normal braking operation.

(2) A skid control operation (see FIG. 3)

When the wheels are braked too abruptly so that the vehicle becomes a skid condition during actuation of the wheel cylinder WC, the control circuit 108 senses the skid condition to energize the solenoid 25. The plunger 27 is moved by the solenoid 25 in opposition to the force of the spring 38 into a position as shown in FIG. 3 in which the ball valve 39 closes the bore 29 and the ball valve 40 opens the drain port 33. As a result, the chamber 68 communicates with the sump 34 by way of the passageway 69, the chamber 36 and the drain port 33 to exhaust hydraulic fluid in the chamber 68. This permits the fluid pressure in the expansion chamber 66 to move the expansion piston 58 and the operating piston 62 into the skid control position as shown in FIG. 3 in which the check valve 72 is closed by the force of the spring 82 to prevent transmission of the braking pressure from the master cylinder MC to the wheel cylinder WC. On the other hand owing to closing of the check valve 72 and expansion of the volume of the expansion chamber 66 by the leftward movement of the expansion piston 58, the pressure of the hydraulic fluid confined in the hydraulic fluid route between the wheel cylinder WC and the chamber 66 is reduced to lower the braking force for the wheels. Thus, the wheels are released from locking and the vehicle is prevented from being kept in the skid condition. In this instance, because of the leftward movement of the expansion piston 58 in excess of the length L, the plunger 90 is retracted into the body 86 by the ramp 97 of the expansion piston 58 to electrically connect the conductors 98 and 100 with each other. In response to closing of the switch device 84, the indicator 104 is actuated by the circuit 102 to indicate that the system 20 is in the skid control condition. This informs the driver that although the brakes are ineffective in spite of depression of the brake pedal, this is because of the skid control operation but not because of failure of the braking system.

(3) The event of hydraulic failure (see FIG. 4)

In the event of failure of the pressurized hydraulic fluid source P or other fluid leakage, owing to loss of the fluid pressure in the chamber 45, the first and second spools 42 and 43 are moved by the force of the spring 47 into a fail safe position as shown in FIG. 4 in which the valve 52 is opened to allow communication between the chambers 46 and 49 and the valve 53 is closed to block communication between the chambers 48 and 49. Concurrently, owing to decrease in the fluid pressure in the chamber 68 the operating piston 62 and the expansion piston 58 are moved leftwards by the braking pressure applied into the expansion chamber 66 by way of the check valve 72. However, due to the provision of the restricted passage portion (no numeral) in passage 29 the pressure decrease in chamber 68 is slower than in passage 32 and chamber 31 ensuring that the spool valves 42 and 43 isolate the wheel cylinder WC from the expansion chamber 66 prior to any substantial movement of the expansion valve 58. This isolation of course traps a relatively small amount of pressurized fluid in the chamber 66 so that the expansion valve 58 moves only a short distance before pressure equalization occurs across same (viz., the pressures in chambers 66 and 68 are equal). The isolation also ensures that an undesirable loss of master cylinder pressure into the expansion chamber 66 will not occur should the brakes be applied at the same time as the loss of hydraulic pressure from the pump.

Thus, in the case that the pump fails, the expansion valve will stop in the position shown in FIG. 4 in which the check valve 72 is closed to separate the chamber 66 from the chamber 74. At this time, the plunger 90 is in contact with the small diameter portion 96 of the expansion piston 58 because of the movement of the expansion piston 58 in less than the length L from the normal braking position. Therefore, the switch device 84 is open so that the indicator 104 is not actuated. In this instance, the braking pressure delivered into the inlet port 50 is fed to the rear wheel cylinder WC by way of the chamber 46, the bypass passage 49 and the outlet 51 to attain the normal braking operation. But, in this instance, the skid control operation is not performed. It will, of course, be further appreciated that it is a simple matter for the skilled artesan to decide the length L given the volume of fluid isolated in the chamber 66, the diameter of the spools 58 and 64, and so forth.

Figure 5:
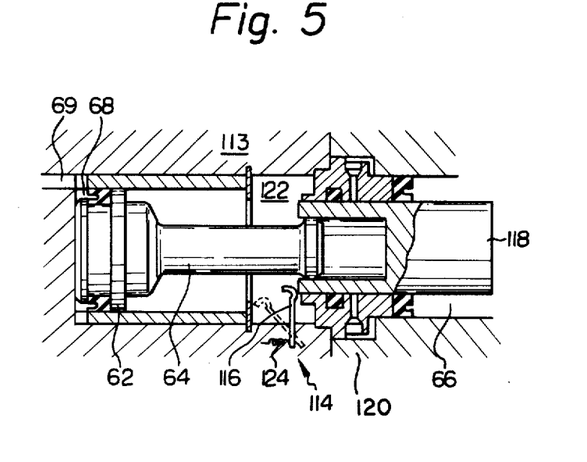
FIG. 5 is a partial schematic cross-sectional view of a preferred second embodiment according to the present invention.

Referring now to FIG. 5 of the drawings, there is partly shown a further embodiment of a skid control system according to the invention. In FIG. 5, the illustration of portions is omitted which are similar to those of the skid control system 20 shown in FIG. 2. The skid control system 113 shown in FIG. 5 differs from the skid control system 20 shown in FIG. 2 in that a switch device 114, which provides an indication of a skid control operation, comprises a lever 116 cooperating with an expansion piston 118. The lever 116 is supported by a body 120 of the skid control system 113 and extends transversely to the axis of the expansion piston 118 and projects into a chamber 122 formed in the body 120 at an end of the expansion piston 118 and communicating with the atmosphere. The lever 116 is abutted at an end against an end surface of the expansion piston 118 and is angularly movable by movement of the expansion piston 118. The switch device 114 further comprises a spring 124 urging the lever 116 toward a position in which the lever 116 abuts with the expansion piston 118, and a switch (not shown) controlled by the lever 116. The switch is opened when the lever 116 contacts with the expansion piston 118 which is in a normal braking position corresponding to the normal braking position, shown in FIG. 2, of the expansion piston 58. When the lever 116 is tilted by the expansion piston 118 which is moved into a position corresponding to the position, shown in FIG. 4, of the expansion piston 58, the switch is still open. When the lever 116 is further tilted by the expansion piston 118 which is moved into a skid control position corresponding to the skid control position, shown in FIG. 3, of the expansion piston 58, the switch is closed by the lever 116. The switch device 114 has a circuit (not shown) electrically connected to the switch and similar to the circuit 102 and electrically connected to an indicator (not shown), similar to the indicator 104, which provides an indication to the driver when the switch is closed.

It will now be appreciated that, with a switch device actuable by an expansion piston of a skid control system, a skid control operation of the skid control system can be distinguished from a fail safe operation of the system because the difference, in amount, in the movement of the expansion piston during the skid control operation from that during the fail safe operation is sensed.

It will also be appreciated that the provision of the switch device exerts no shock on a brake pedal against to the manual effort exerted thereto during braking.

It will also be appreciated that the switch device does not require a seal construction.

It will further be appreciated that the installation of the switch device to the skid control system does not result in the complicated construction of the skid control system.

What is claimed is:

1. A skid control system for a vehicle including a wheel brake cylinder, comprising:
   a valve having an open position for a normal braking operation and having a closed position for a skid control operation;
   a hydraulic pressure responsive actuator for said valve, said actuator including an expansion piston which has a large diameter portion and a small diameter portion and a normal braking position in which said expansion piston allows said valve to take said open position and a skid control position in which said expansion piston allows said valve to take said closed position;
   means responsive to movement of said expansion piston for producing a signal only when said expansion piston has moved into said skid control position, said movement responsive means including a switch device,
   said switch device comprising a plunger extending slidably transversely to the axis of said expansion piston and having one end which contacts with a first peripheral surface of said small diameter portion when said expansion piston is in said normal operating position and which contacts with a second peripheral surface of said large diameter portion when said expansion piston is in said skid control position, and
   two electric conductors spaced from each other,
   said plunger having the other end thereof spaced from said two electric conductors to disconnect same from each other when said one end of said plunger is in contact with said first peripheral surface and which contacts with said two electric conductors to connect same to each other when said one end of said plunger is in contact with said second peripheral surface.

2. A skid control system as claimed in claim 1, in which said expansion piston has at an end thereof a chamber formed in a body of said skid control system and communicating with the atmosphere,
   said switch device further comprising
   a body having therein a bore which communicates with said chamber and which receives therein said plunger and said electric conductors.

3. A skid control system for a vehicle including a wheel brake cylinder, comprising:
   a valve having an open position for a normal braking operation and having a closed position for a skid control operation;
   a hydraulic pressure responsive actuator for said valve, said actuator including an expansion piston which has a normal braking position in which said expansion piston allows said valve to take said open position and a skid control position in which said expansion piston allows said valve to take said closed position;
   means responsive to movement of said expansion piston for producing a signal only when said expansion piston has moved into said skid control position, said movement responsive means including a switch device, said switch device comprising, a lever extending transversely to the axis of said expansion piston and abutting against an end of said expansion piston so as to be angularly movable by movement of said expansion piston, biasing means for urging said lever toward a position in which said lever abuts against said expansion piston, and a switch which is opened by said lever when said expansion piston is in said normal braking position and which is closed by said lever when said expansion piston assumes said skid control position.

4. A skid control system as claimed in claim 3, in which said expansion piston has at said end surface a chamber formed in a body of said skid control system and communicating with the atmosphere, said lever projecting into said chamber.

5. An anti-skid device, including a pump which supplies a control pressure, for use in a wheeled vehicle which has a master cylinder and at least one wheel cylinder, comprising:

means defining a first variable volume passage between said master cylinder and said at least one cylinder, means defining a second substantially constant volume passage between said master cylinder and said at least one wheel cylinder, first spool means responsive to said control pressure for varying the volume of said first passage, second spool means responsive to said control pressure for normally establishing fluid communication between said master cylinder and said at least one wheel cylinder via said first passage and for establishing communication between said master cylinder and said at least one wheel cylinder via said second passage upon the loss of said control pressure, means defining a flow restriction between said pump and a control chamber of said first spool means into which said control pressure is fed, said first spool means including a spool which assumes a first position during normal braking, a second position during anti-skid operation of the anti-skid device, and a third position intermediate of said first and second positions when said control pressure is lost, and a switch having a first normal state and a second state and which is responsive to the position of said spool to switch from first state to said second state only upon said spool assuming a position between said second position and said third position.

6. An anti-skid device as claimed in claim 5, wherein said spool has first and second lands which define an atmospheric chamber therebetween, and in which said switch is disposed so as to have a contact member thereof project into said atmospheric chamber so that contact member contacts a portion of said spool to switch to said second state only upon said spool moving beyond said third position toward said second position.

7. An anti-skid device as claimed in claim 5, further comprising:

a single electromagnetic two position valve interposed between said control chamber and said flow restriction for closing a drain port of said control chamber and permitting fluid communication between said pump and said control chamber in the first position thereof and opening said drain port and preventing fluid communication between said pump and said control chamber via said flow restriction in the second position thereof.

* * * * *